Figure 1:
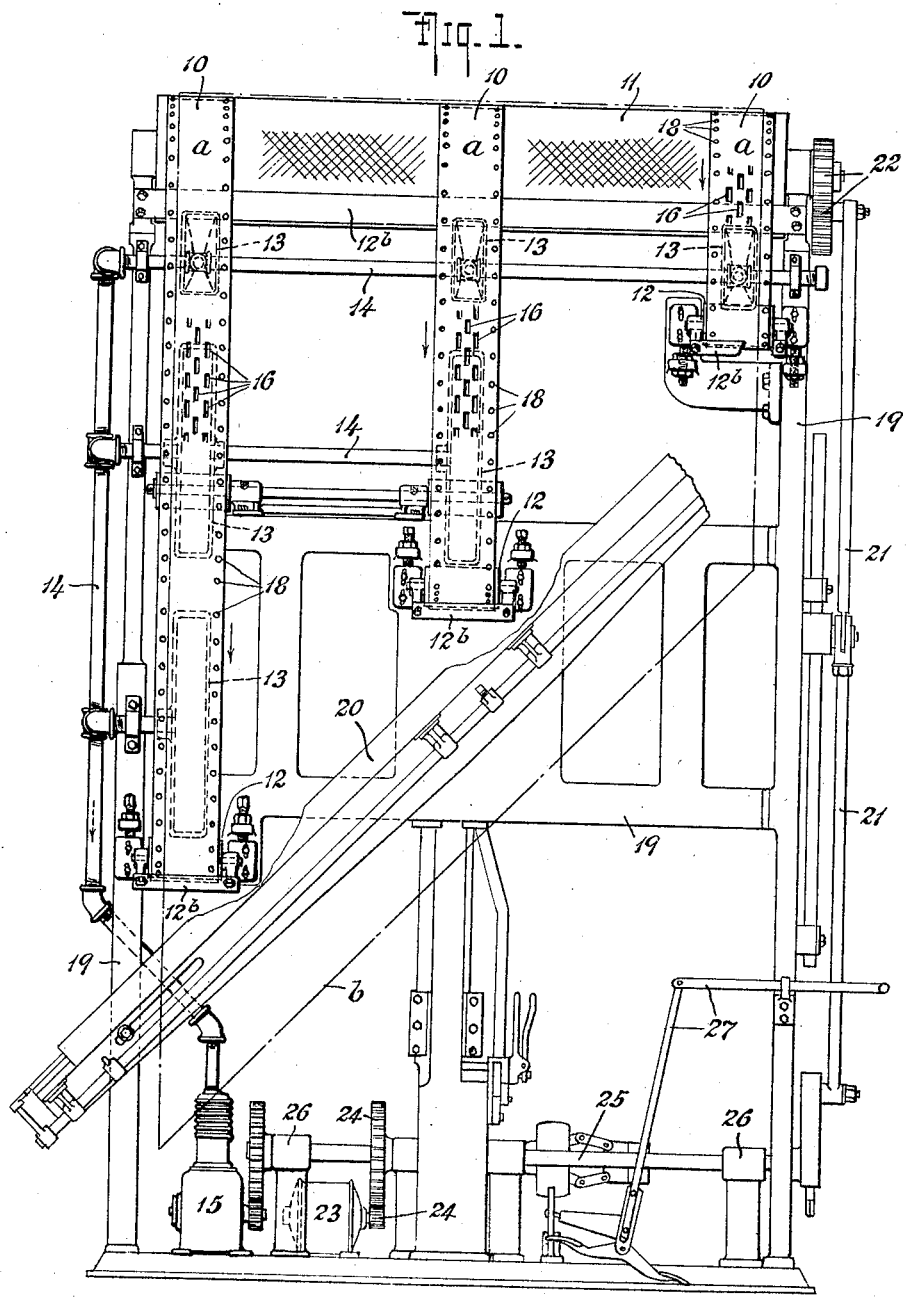

Dec. 14, 1926.

W. W. SPADONE ET AL 1,610,818

FEEDING MECHANISM

Filed Jan. 31, 1925    2 Sheets-Sheet 1

INVENTORS
WALTER W. SPADONE
CHARLES C. SPADONE
BY

ATTORNEYS

Dec. 14, 1926.
W. W. SPADONE ET AL
1,610,818
FEEDING MECHANISM
Filed Jan. 31, 1925   2 Sheets-Sheet 2
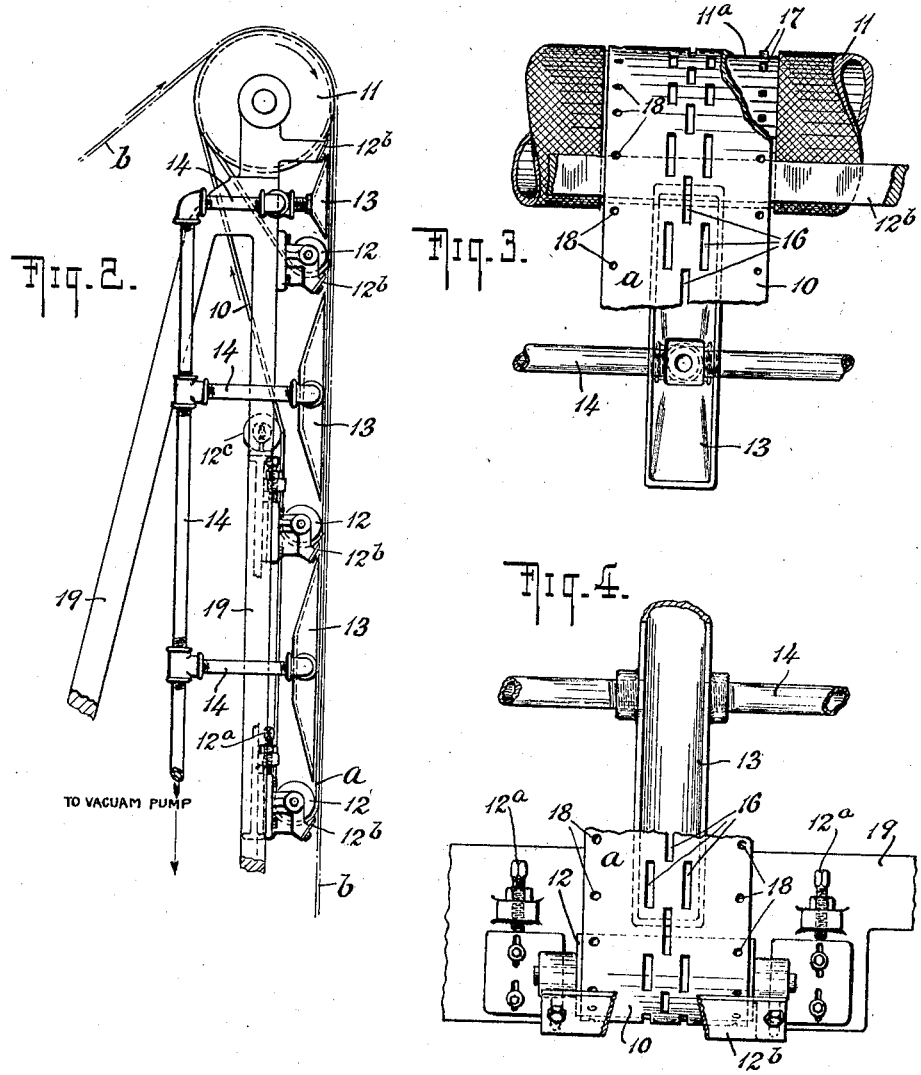
INVENTORS
WALTER W. SPADONE
CHARLES C. SPADONE
BY
ATTORNEYS Patented Dec. 14, 1926.

1,610,818

UNITED STATES PATENT OFFICE.

WALTER W. SPADONE, OF NEW YORK, AND CHARLES C. SPADONE, OF ROCKVILLE CENTER, NEW YORK, ASSIGNORS TO SPADONE MACHINE COMPANY, INCORPORATED, OF NEW YORK, N. Y., A CORPORATION OF NEW YORK.

FEEDING MECHANISM.

Application filed January 31, 1925. Serial No. 6,097.

The invention relates to feeding mechanism which operates either continuously or in successive steps and has for its object to provide a simple and novel mechanism in which the material being fed is carried by a movable conveyer and held thereon against relative movement by suction. The invention contemplates further the provision of a novel feeding mechanism whereby a web of material is fed in a vertical direction in periodic steps and wherein suction is utilized to connect the web with one or more endless belts or their equivalent and to maintain said web against undesirable swaying out of its intended path. Other more specific objects will appear from the description hereinafter and the features of novelty will be pointed out in the claims.

In the drawings, the invention is embodied in a fabric cutting machine of the kind commonly known as bias cutters whereby fabric for use in the manufacture of pneumatic tires is cut in successive sections on the bias. Such a machine presents the problem of advancing a web of material in successive steps and also the problem of maintaining such web against undesirable swaying out of its intended path in order that the successive cuts may be uniform and properly made. The present invention is thus particularly adapted to machines of this and kindred types, although it is to be distinctly understood that the illustrated installation is not intended to define the limits of said invention. In said drawings, Fig. 1 is a diagrammatic front elevation of a fabric cutting machine with an example of the invention combined therewith; Fig. 2 is a fragmentary side view thereof and Figs. 3 and 4 are fragmentary front views of the invention as shown in Fig. 1.

The novel mechanism comprises a conveying or feeding means which is advanced in a given direction by suitable mechanism and suction producing means stationary with respect to the conveying means and arranged in such a manner that the suction created thereby is effective to hold the material being fed, in engagement with the conveying means and to thereby maintain said material against any independent movement relatively to the conveying means such as, for instance, a swaying out of its intended path. The essential elements are shown in Figs. 3 and 4 of the drawings in which the conveying or feeding means is shown in the form of an endless belt 10 passing over suitably mounted rollers 11 and 12 at least one of which may be driven by suitable mechanism to advance the belt 10 in the predetermined manner. One run of the belt 10 indicated at $a$ passes over and in close proximity to one or more suction devices, which in the illustrated example are shown in the form of flaring nozzles 13 connected by means of suitable pipes 14 with a source of suction such as a suction pump 15. The arrangement is such that the suction created in the nozzles 13, by the action of the pump 15 or its equivalent, is effective upon the outer surface of the run $a$; if the material of which the belt 10 is made is impervious to suction, the belt 10 may be provided with perforations 16 arranged to travel in registry with the nozzles 13 as shown for instance in Figs. 1, 3, and 4. In such case, the perforations 16 may be elongated or of other suitable form and may be so grouped on the belt as to pass within the suction zones defined by the nozzles 13. In order to positively prevent slippage of the belt 10 on the rollers 11 and 12, one or both of the latter may be provided with teeth 17 adapted to cooperate with apertures 18 located along opposite edges of the belt 10 as shown in the drawings; it will be understood, however, that this expedient or its equivalent may be dispensed with and the frictional contact between the rollers and the belt alone relied upon to prevent such slippage. To provide for the adjustment of the belt 10 the bearings in which the roller 12 is journalled may be movably mounted and controlled by means of adjusting screws 12$^a$; in addition strippers 12$^b$ may be provided to prevent the material from travelling with the belt around the roller 12. If necessary, one or more guide rollers 12$^c$ may be utilized to guide the belt 10 as shown in Fig. 2.

For the purpose of illustrating a practical embodiment of the invention it is shown in the drawings as applied to a fabric cutting machine of the type commonly known as "bias-cutters," an example of which is shown in the Julius Wegner Patent No. 1,384,984, of July 19, 1921, to which type of machine the invention is particularly adapted. The fabric cut by such machines is generally a composite fabric of the character used in the manufacture of pneumatic tires and, in the operation of the machine, is fed downwardly in a vertical direction; the uncut fabric thus depends from an upper feed roller and as it is periodically fed along very often develops a sway or other undesirable movement whereby the fabric is shifted out of its intended path. This is particularly true, in bias cutters, of the longest end section of the uncut material which very often shifts out of its intended path and thus destroys the uniformity and accuracy of successive cuts. These objectionable features are entirely overcome with the present invention. In the form shown in the drawings three duplicate devices of varying lengths are employed in the machine, it being understood that this number may be increased or diminished to meet the particular requirements of a given condition; similarly the width of the belts and other details of the specific arrangements illustrated in the drawings may be varied in accordance with existing requirements.

The bias cutter comprises a customary frame 19 provided with an inclined raceway 20 in which the cutting means whereby the fabric is cut on the bias, is reciprocated. The machine further includes suitable feeding mechanim 21 operatively connected at 22 with the upper feed roller 11; the latter is mounted in suitable bearings and is of an axial length corresponding to the width of the machine as shown in Fig. 1. The feeding mechanism, as well as other moving parts of the machine, are operated by means of an electric motor 23 connected by means of gearing 24 with a shaft 25 journalled in bearings 26; the machine is also provided with suitable controlling means 27 for controlling the operation thereof in the customary manner. It will be understood that only a skeleton of the cutting machine is shown and described and that said machine may include all features commonly found in machines of the indicated class and that it operates in the well known way.

As shown in Fig. 1, three belts 10 pass over the feed roller 11 respectively near the opposite ends and at the center thereof and over rollers 12 which are mounted in suitable bearings located on the frame of the machine following the inclination of the raceway 20 as shown in Fig. 1; the three belts 10 are accordingly of progressively lesser lengths from the left to the right of the machine when looking at Fig. 1. To maintain the belts 11 against shifting lengthwise of the roller 11, the latter may be provided with circumferential recesses 11ª for the accommodation of said belts, the teeth 17, if they are included in the arrangement, in such case being located in said recesses as shown in Fig. 3. With this arrangement the belts 10 lie flush with the surface of the roller 11 and the teeth 17 do not project beyond the same so that there is no interference with the passage of the material b over said roller 11. Nozzles 13 are located behind and in close proximity to the run a of each belt 10, the longest belt in the illustrated example passing over three of such nozzles, the middle belt 10 over two and the shortest belt 10 over one nozzle as indicated in Fig. 1, it being understood that this arrangement may be varied as required; the nozzles 13 are all connected with each other and with the pump 15 by means of suitably arranged pipes 14 as illustrated in Figs. 1 and 2. The pump 15 may be driven in any convenient manner, coincidentally with the operation of the bias-cutter, as for instance, by being connected with the shaft 25 through the medium of suitable gearing 28 and thus with the motor 23.

In practice during a given operative period the motor 23 is in continuous operation, the starting and stopping of the machine being accomplished through the medium of the controlling means 27; as a result of this, the pump 15 is also in continuous operation during such operation period so that a continuous suction is developed in the nozzles 13. It will, of course, be obvious, if existing conditions make the same desirable, that this arrangement may be changed so as to create a suction in the nozzles 13 only as required. In the illustrated machine the fabric b passes over the feed-roller 11, as shown by dotted lines in Fig. 2, and is fed in successive steps in accordance with the dimensions desired in the fabric sections or in other words the predetermined distance between successive cuts; between the feeding steps, the fabric b remains stationary long enough to permit the cuts to be completed, it being understood that the cut sections are removed from the machine either manually or automatically by means of suitable mechanism.

As the fabric b passes over the roller 11 it depends therefrom over the runs a of the belts 10 and is fed downwardly as required; because of the fact that the lower edge of the depending portion of the fabric b extends on the bias, it depends in a point which has a tendency normally to sway toward the center of the machine at such point and thereby disturb the position of said fabric along the line of the next successive cut. As a result of this the uniformity and correctness of successive cuts ordinarily would be interfered with unless, as in the present case, provision to prevent the same is made. With the arrangement illustrated in the drawings, the fabric b depends over the runs a of the belts 10 and is drawn into surface engagement therewith by the suction in the nozzles 13, the suction being sufficiently great to bring about a positive connection between the fabric *b* and the runs *a* of the belts 10 without however interfering with the feeding movement of the latter; if the perforations 16 are present in the belts, this connection between the runs *a* and the fabric *b* will be still further strengthened because the suction effect will tend to draw the fabric somewhat into said perforations and thus create a positive bond between fabric and belts. Thus as the roller 11 is rotatively actuated the belts 10 will be correspondingly operated and the upper runs *a* thereof will pass through the suction zones created by the suction in the nozzles 13 and consequently the fabric *b* will be positively fed in the desired manner; at the same time, the fabric *b* will be firmly held against any swaying or other unintentional shifting. The successive cuts will thus be absolutely true and uniform and extend along the desired line as predetermined by the position of the raceway 20; the section of the fabric which is below the cut is beyond and outside of the suction zones and is thus easily removable without difficulty.

The novel feeding mechanism provides a means whereby a material may be positively connected with a feeding element and fed thereby, in a given direction, either continuously or in successive steps in a positive manner and in a given path without the necessity for the use of complicated mechanical devices; the arrangement further positively holds the material in a given position, for instance, while a given operative step is performed in connection therewith and positively maintains said material against unintentional shifting out of its intended path. In addition, particularly in the case of fabric cutting machines and the like, the suction effective upon the material serves to eradicate wrinkles therein and prevents shrinkage of such material whenever the conditions are such that a tendency to shrink exists. The invention, although especially adapted for use in machines of the type illustrated, is capable of efficient use in many other ways.

Various changes in the specific form shown and described may be made within the scope of the claims without departing from the spirit of our invention.

We claim:

1. The combination of an upper feed roller for feeding a web of material downwardly, a lower roller located in spaced vertical relation to said feed roller, means for operating said feed roller to develop a loose pendent section in said web of material depending from said feed roller, an endless belt passing over said feed roller and said lower roller behind said pendent section of said web of material, a nozzle in close proximity to the rear surface of the outer run of said belt, and means for creating suction in said nozzle effective through said belt upon the pendent section of said web of material to positively connect it with said belt and prevent displacement of said pendent web section out of its intended path.

2. The combination of an upper feed roller for feeding a web of material downwardly, a plurality of lower individual rollers spaced apart in axial directions and located in spaced vertical relation to said feed roller, means for operating said feed roller to develop a loose pendent section in said web of material, endless belts passing over said feed roller and over each of said lower rollers, nozzles in close proximity to the rear surfaces of the outer runs of said belts, and means for creating suction in all of said nozzles effective through each of said belts upon said pendent section of said web of material to positively connect it with said belts and prevent displacement of said pendent web section out of its intended path.

3. The combination of an upper feed roller for feeding a web of material downwardly, a plurality of lower, individual rollers spaced apart in axial directions and located in spaced, vertical relation to said roller at progressively reduced distances therefrom, means for operating said feed roller to develop a loose pendent section in said web of material, individual endless belts passing over said feed roller and over each of said lower rollers, nozzles in close proximity to the rear surfaces of the outer runs of said belts, the latter being each provided with perforations grouped to pass within the zones defined by said nozzles, and a suction pump for creating suction in all of said nozzles effective through the perforations of each of said belts upon said pendent section of said web of material to positively connect it with said belts and prevent displacement of said pendent web section out of its intended path.

In testimony whereof we have hereunto set our hands.

WALTER W. SPADONE.
CHARLES C. SPADONE.